United States Patent
Chagoly et al.

(10) Patent No.: US 7,424,720 B2
(45) Date of Patent: Sep. 9, 2008

(54) PROCESS AND IMPLEMENTATION FOR DYNAMICALLY DETERMINING PROBE ENABLEMENT USING OUT OF PROCESS CORRELATING TOKEN

(75) Inventors: Bryan Christopher Chagoly, Austin, TX (US); Xiaoping Chen, Austin, TX (US); Howard Milton McKinney, Austin, TX (US); Kirk Malcolm Sexton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 10/809,580

(22) Filed: Mar. 25, 2004

(65) Prior Publication Data

US 2005/0251574 A1    Nov. 10, 2005

(51) Int. Cl.
G06F 3/00    (2006.01)
G06F 9/44    (2006.01)
G06F 9/46    (2006.01)
G06F 13/00   (2006.01)

(52) U.S. Cl. .................... 719/328; 717/162
(58) Field of Classification Search ............. 719/328; 717/130
See application file for complete search history.

(56) References Cited

U.S. PATENT DOCUMENTS

| | | | | |
|---|---|---|---|---|
| 5,528,759 A | | 6/1996 | Moore ............... 395/200.11 |
| 5,537,548 A | * | 7/1996 | Fin et al. ............ 709/204 |
| 5,706,429 A | | 1/1998 | Lai et al. ............ 395/200.01 |
| 5,987,250 A | * | 11/1999 | Subrahmanyam ........ 717/130 |
| 6,108,619 A | | 8/2000 | Carter et al. ............ 704/9 |
| 6,161,200 A | * | 12/2000 | Rees et al. ............ 714/38 |
| 6,186,677 B1 | * | 2/2001 | Angel et al. ............ 717/118 |
| 6,314,558 B1 | * | 11/2001 | Angel et al. ............ 717/118 |
| 6,327,700 B1 | * | 12/2001 | Chen et al. ............ 717/127 |
| 6,792,460 B2 | * | 9/2004 | Oulu et al. ............ 709/224 |
| 2002/0129337 A1 | * | 9/2002 | Evans et al. ............ 717/124 |
| 2002/0143933 A1 | | 10/2002 | Hind et al. ............ 709/224 |
| 2003/0149960 A1 | * | 8/2003 | Inamdar ............ 717/118 |
| 2003/0217094 A1 | | 11/2003 | Andrews et al. ............ 709/201 |
| 2005/0039171 A1 | * | 2/2005 | Avakian et al. ............ 717/127 |
| 2005/0039172 A1 | * | 2/2005 | Rees et al. ............ 717/130 |
| 2005/0039186 A1 | * | 2/2005 | Borkan ............ 719/310 |

* cited by examiner

*Primary Examiner*—Thomas Lee
*Assistant Examiner*—KimbleAnn Verdi
(74) *Attorney, Agent, or Firm*—Duke W. Yee; Jeffrey S. LaBaw; Gerald H. Glanzman

(57) ABSTRACT

The present invention addresses the problem of linking cross-process and cross-thread subtransactions into a single user transaction. The mechanism of the present invention employs bytecode inserted probes to dynamically detect out of process correlating tokens in an inbound request. The bytecode inserted probes retrieve the correlating token in the inbound request. Based on the correlating token retrieved, the bytecode inserted probes are then used to dynamically determine if the inbound user request should be recorded and linked to a transaction that began in another thread or process.

8 Claims, 2 Drawing Sheets

PROCESS AND IMPLEMENTATION FOR DYNAMICALLY DETERMINING PROBE ENABLEMENT USING OUT OF PROCESS CORRELATING TOKEN

BACKGROUND OF THE INVENTION

1. Technical Field

The present invention relates generally to an improved data processing system and, more specifically, to a method, apparatus, and computer instructions for dynamically determining probe enablement using out of process correlating tokens.

2. Description of Related Art

Performance monitoring is often used in optimizing the use of software in a system. A performance monitor is generally regarded as a facility incorporated into a processor to assist in analyzing selected characteristics of a system by determining a machine's state at a particular point in time. One method of monitoring system performance is to monitor the system using a transactional-based view. In this manner, the performance monitor may access the end-user experience by tracking the execution path of a transaction to locate where problems occur. Thus, the end user's experience is taken into account in determining if the system is providing the service needed. The performance monitor used may be any suitable transaction-based monitoring system, such as, for example, IBM Tivoli Monitoring and Transaction Performance, a product of International Business Machines Corporation in Armonk, N.Y.

A number of performance monitoring tools have been developed to monitor and analyze the performance of applications within a system. As Java continues to become the Internet's dominant programming environment, Java applications are becoming increasingly more prevalent as the type of application used to support server and client computers. Java applications are also becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

A known method of monitoring system performance is to insert probes into the bytecode to help identify performance bottlenecks occurring within a transaction. Existing performance monitoring tools may also be used to link user transactions and sub-transactions using correlating tokens, such as ARM (Application Response Measurement) correlators. Correlating tokens are passed in user transactions to allow for monitoring the progress of the user transactions through the system. As an initiator of a transaction may invoke a component within an application and this invoked component can in turn invoke another component within the application, correlating tokens are used to "tie" these transactions together. For example, when a user invokes component A within an application, a transaction is created. Component A may call component B asynchronously to request that component B perform a specific process of the user transaction. Component A passes a unique correlating token with the call. When component B sends the response to component A, component A must be able to determine that the response correlates to the call. Thus, when component B finishes the invoked service, component B calls component A and passes back the original token. This process allows component A to correlate the request and the response.

Problems related to linking user transactions and sub-transactions may occur when a sub-transaction occurs out of process of the initial user transaction. Although known performance monitoring tools provide mechanisms for monitoring applications to identify system bottlenecks, none of these known tools employ bytecode inserted probes to link cross-process or cross-thread sub-transactions into a single user transaction. Using a Java 2 Platform Enterprise Edition (J2EE) transaction in a WebSphere Application Server as an example, if two or more WebSphere processes exist (which may or may not be running on different physical machines) and one process requests a method invocation from an Enterprise Java Bean (EJB) in a second WebSphere process, this unique user transaction should be linked and correlated across both WebSphere processes. Websphere applications, such as WAS, are available from International Business Machines Corporation. WAS is a J2EE application server that provides an operating environment for e-business applications that perform transactions over the internet.

Therefore, it would be advantageous to have a method, apparatus, and computer instructions for linking cross-process or cross-thread sub-transactions, using any given means of passing a correlating token to another process, into one user transaction.

SUMMARY OF THE INVENTION

The present invention addresses the problem of linking cross-process and cross-thread subtransactions into a single user transaction. The mechanism of the present invention employs bytecode inserted probes to dynamically detect out of process correlating tokens in an inbound request. The bytecode inserted probes retrieve the correlating token in the inbound request. Based on the correlating token retrieved, the bytecode inserted probes are then used to dynamically determine if the inbound user request should be recorded and linked to a transaction that began in another thread or process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
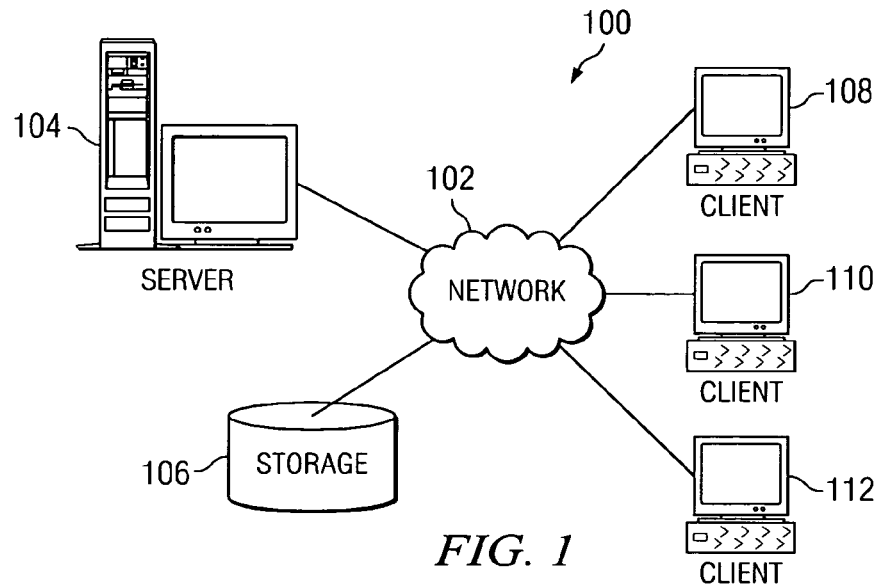
FIG. 1 is a diagram of a distributed data processing system in which the present invention may be implemented.

With reference now to the figures, and in particular with reference to FIG. 1, a diagram of a distributed data processing system is depicted in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. Distributed data processing system 100 may be for example, the Internet, a local area network, or a wide area network.

In the depicted example, a server 104 is connected to network 102 along with storage unit 106. In addition, client 108, 110, and 112 also are connected to network 102. These clients may be, for example, without limitation, personal computers or network computers. A network computer is any computer, coupled to a network, which receives a boot image from another computer coupled to the network and also may be a server managed computer. Server 104 provides data, and may be form example, a web server on the Internet, and applications to computers 108-112. Clients 108, 110, and 112 are clients to server 104. Distributed data processing system 100 may include additional servers, clients, and other devices not shown. FIG. 1 is intended as an example, and not as an architectural limitation for the processes of the present invention.

Figure 2:
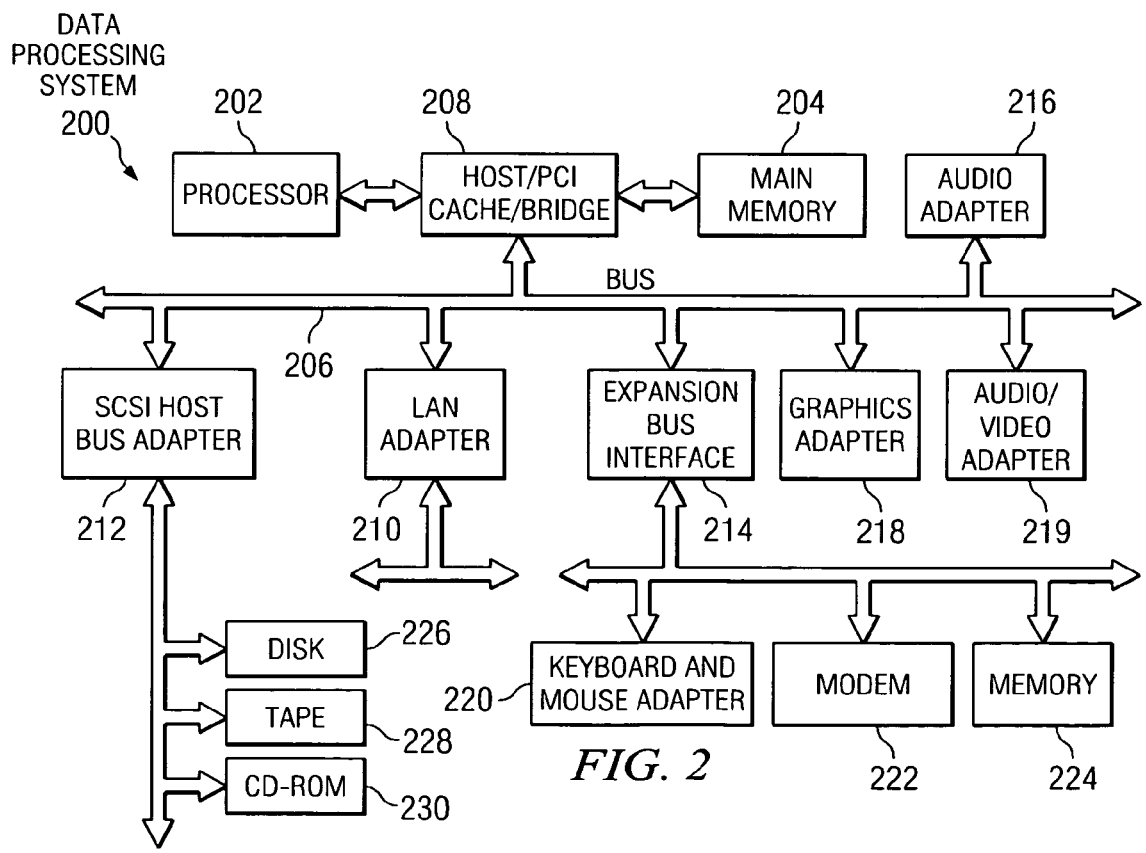
FIG. 2 is a block diagram of a data processing system in which the present invention may be implemented.

Turning next to FIG. 2, a block diagram of a data processing system 200 in which the present invention may be implemented is illustrated. Data processing system 200 may be used either as a server or a computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. The depicted example is not meant to imply architectural limitations with respect to the present invention.

The present invention provides a method, data processing system, and computer instructions for using bytecode inserted probes to detect out of process correlating tokens. The mechanism of the present invention provides for inserting probes into a bytecode injected application to determine if an incoming user transaction should be recorded and linked to a transaction that began in another thread or process. The bytecode inserted probe may use any method to retrieve the incoming correlating token while it is running in-line with the user transaction, such as, for example, calling the probe's TransactionInfo object getParentCorrelator( . . . ). The probe may pass the obtained correlating token to a performance monitor, which then links the inbound transaction with a transaction that began in another thread or process based on the correlating token. In this manner, the present invention provides for retrieving a correlating token in an inbound request to link cross-process or cross-thread sub-transactions into a single transaction.

Furthermore, the probe may retrieve the correlation token from the inbound request, which may pass the correlation token using various methods. For example, in a Java or J2EE environment, a correlating token may be passed across thread boundaries and process boundaries using various methods. These methods include, but are not limited to, attaching the correlating token (1) to an HTTP request and receiving the token in the J2EE filter or servlet via the HttpServletRequest object; (2) to the payload or as a message property of an outbound JMS message; (3) to a Common Object Request Broker Architecture (CORBA) message using a CORBA PortableInterceptor and receiving the token by reading the ServiceContext; and (4) to the Simple Object Access Protocol (SOAP) header of a web service request.

As mentioned previously, correlating tokens are used to express a relationship between two or more transactions. Correlators are used to parse a complex transaction into parent/child relationships, wherein each child or sub transaction may have sub transactions of its own. As a result, splitting the transaction into sub-transactions facilitates problem isolation of the system. A correlation token contains information regarding the user transaction, such as, for example, the unique transaction ID, whether the transaction request was completed, and the amount of time that elapsed before the transaction was completed.

A probe is a program inserted at a key location in a network for the purpose of monitoring or collecting data about network activity. Based on the probe's interface and designation, a probe may be classified as a root node. In other words, the probe is considered the first node in a transaction to be run when a user transaction is initiated in that thread. A probe may be inserted into the bytecode of a service component of an application so that when the JVM loads the component, the probe may detect whether an inbound transaction should be recorded as a sub-transaction of a transaction in a different thread or process.

A flow of execution may be in the context of two different monitored transactions. For example, suppose an application component in a monitored transaction issues an asynchronous request to an out of process service, and then a second application component in a descendant transaction blocks waiting for the corresponding asynchronous response. If the request contained a correlator, then the response may also contain a different descendant correlator. At the junction in the second application component, the transaction context has access to two different parent correlators. One is chosen as the parent, and the other is modeled as an associated transaction. If only one correlator is present, then it is the parent correlator. If no correlators are present, the component monitor may decide to define a root transaction, or the component monitor may defer the decision to the performance monitor.

The probe, (a.k.a. component monitor), intercepts calls to the application service component and accesses containers using various interprocess communication (IPC) mechanisms including, for example, shared memory, remote procedure calls (RPC), named pipes, or other communication protocol implementations of TCP/IP, IPX/SPX, SNA, etc, or direct memory access. The containers may maintain the relationships between the correlators. The probe determines if the containers already have a correlating token. If a correlating token is found in one or more containers, the inbound transaction has a parent transaction. Thus, the correlator from one of the parent transactions will be used for the inbound transaction.

The correlator may include a particular monitoring policy. Based on the policy, the transaction performance monitor and the component monitor are allowed to dynamically include or exclude the component in the transaction model based on the transaction instance. In other words, the policy defines if the transaction should be recorded.

Figure 3:
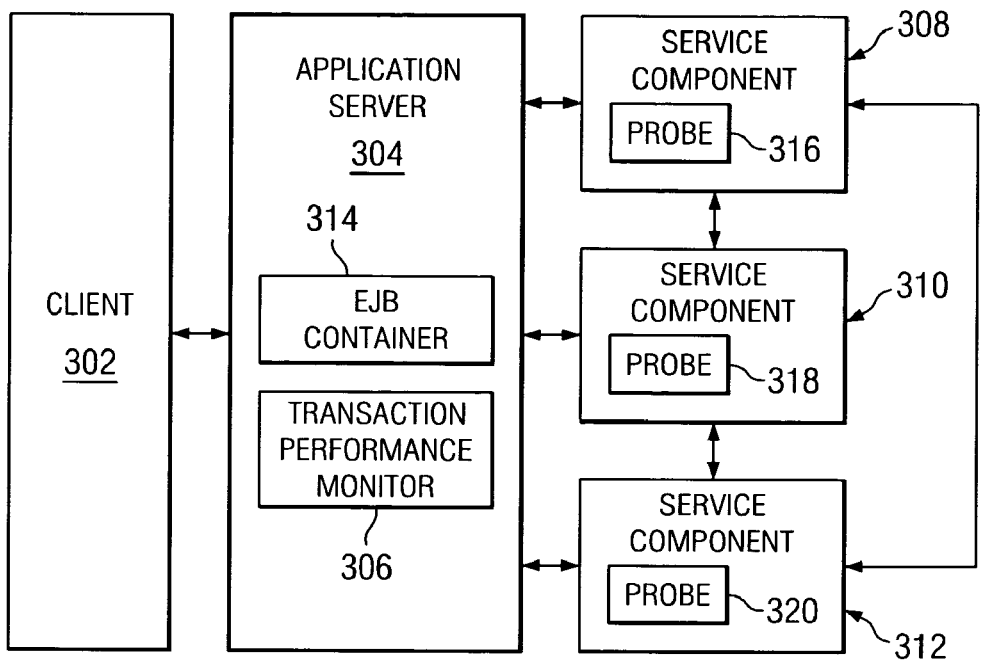
FIG. 3 is a block diagram illustrating an example data processing system that may be used to link a user transaction to a sub-transaction according to the present invention.

Turning to FIG. 3, a block diagram illustrating example components used in monitoring a transaction in a distributed computing system is depicted in accordance with a preferred embodiment of the present invention. Client 302 is an example of a client, such as clients 108, 110, and 112 in FIG. 1. Application server 304 is a process on a data processing system, such as server 104 in FIG. 1, and may function as a combined web server/application server. A typical application server is J2EE-based, running EJBs or other Java components. EJB components encapsulate business rules and other functions in session beans, entity beans, and message-driven beans.

In this example, client 302 sends a request to application server 304. The request may take many forms, such as an HTTP or web service request. The request may also contain a correlating token, which allows transaction performance monitor 306 to correlate this transaction to another transaction or subtransaction.

Application server 304 acts as an intermediary between the client request and the application components that need to run to provide the requested service. In response to receiving the client request, application server 304 parses the request to obtain the Uniform Resource Identifier (URI). The URI is used to establish a web service identity by reference. Based on the URI, application server 304 may identify the web service or services that should be run in order to perform the client request.

Application server 304 invokes the appropriate service component to service the request, such as service components 308, 310, or 312. Service components 308, 310, and 312 each contain all of the logic necessary to perform a specific function. Service component 308, 310, or 312 interprets the request, performs the desired function, and sends a reply to application server 304. This reply is then delivered to client 302.

The invocation of service components 308, 310, and 312 may occur through the use of Enterprise Java Bean (EJB) container 314. As illustrated, service components 308, 310, or 312 may also receive a request from a parent component (when the service component is itself not the root service). Upon the invocation of service component 308, 310, or 312, the service component processes the request. The presence of a probe inserted into the bytecode of the service component, such as probes 316, 318, and 320 results in a determination whether the service component is the root node in the transaction If a service component is the root node in the transaction, a probe, such as probe 316, retrieves the correlating token, if one exists, in the client request. One example method of retrieving the correlating token in the client request includes using a TransactionInfo object. In this example, a method call, such as getParentCorrelator( . . . ), may be used to interrogate the request and read in the appended correlating token. Although a TransactionInfo object is used in this particular example, other methods also may be employed to retrieve the correlating token from the request.

With this correlating token, probe 316 returns this information to transaction performance monitor 306. When transaction performance monitor 306 receives the information, transaction performance monitor 306 may link the transaction as a subtransaction of another transaction. Bytecode inserted probe 316 allows for the retrieval of an out of process correlating token, such that the cross-process or cross-thread transaction may be linked to a transaction in a different thread or process. Currently, this kind of cross-thread and cross-process linking is not facilitated by bytecode inserted probes.

In this manner, the present invention uses inserted bytecode probes to dynamically determine whether a transaction should be linked to another transaction in a different thread or process. The mechanism of the present invention employs a probe inserted into the bytecode of each component of the system. The probes retrieve correlation tokens passed in the inbound transactions and send the correlating token information to the performance monitoring tool. This correlation token information is then used by performance monitor to determine whether to link the inbound transaction with a transaction in a different thread of process.

Figure 4:
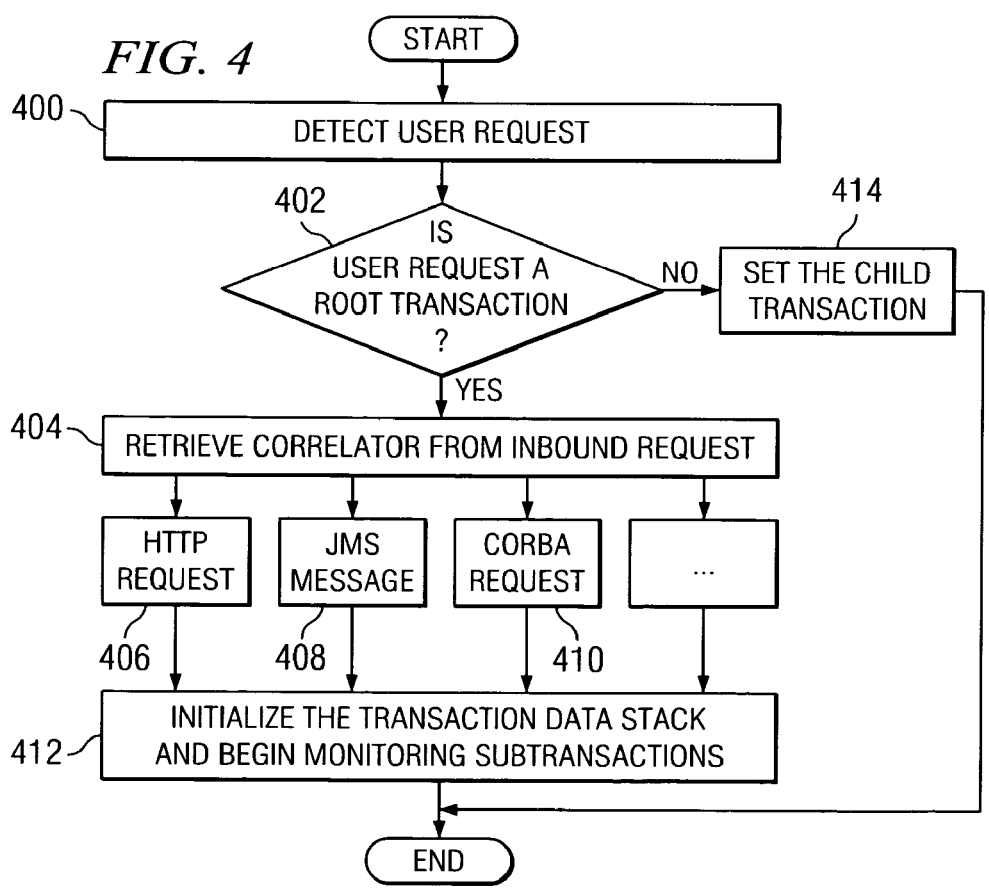
FIG. 4 is a flowchart of a process for using bytecode inserted probes to determine if a transaction should be linked to a transaction that began in another thread of process in accordance with a preferred embodiment of the present invention.

FIG. 4 shows a flowchart for using bytecode inserted probes to determine if a transaction should be linked to a transaction that began in another thread of process in accordance with a preferred embodiment of the present invention. The process illustrated in FIG. 4 may be implemented in a server, such as server 304 in FIG. 3.

The process begins by detecting a user request for a service (step 400). This request is initiated by a client, such as client 302 in FIG. 3. A determination is then made as to whether the transaction is a root transaction (step 402). This determination may be made by the probe, (a.k.a. component monitor), or the performance monitor. For example, the probe may decide whether to initiate a request to the performance monitor, thus deferring the decision to the performance monitor. Alternatively, the probe may decide to ignore the transaction, thus deciding not to monitor it. The decision process for both the probe and the performance monitor could be based on any defined context for the transaction instance.

A transaction may be a root transaction if the component receiving the request is the first node initiated for that particular thread. For example, if a correlating token for the inbound transaction is not found in the container, the transaction is a root transaction. In addition, probes that are inserted into locations known to be locations where root transactions will be initiated are classified as root probes. Only these root probes can create root transactions. Several examples of root probes are for Servlets, EJBs, Web Servies, JMS, RMI, JSPs, etc.

If the transaction is a root transaction, the performance monitor calls the probe to retrieve the correlating token by interrogating the inbound transaction and reading the appended correlation token (step 404). The probe may retrieve the correlating token using various methods, including calling the probe's TransactionInfo object's getParentCorrelator( . . . ) to retrieve the correlation token in the inbound transaction. The correlation token may be passed in the inbound transactions in various ways, such as, for example, through an HTTP request (step 406), a JMS message (step 408), and a CORBA request (step 410).

In response, the performance monitor receives the correlation token information from the probe. The performance monitor then initializes the transaction data stack and begins recording the transaction (step 412). In this manner, the recorded transaction may be linked to transactions that occurred in another thread or process.

If the transaction is determined not to be a root transaction, the performance monitor sets the child transaction (step 414). In other words, if a transaction is not a root transaction (i.e., a parent correlator already exists in the container), then the parent correlator is used for the inbound transaction and no further correlator retrieval is necessary and the process terminates thereafter.

Thus, the present invention provides a method, data processing system, and computer instructions for using bytecode inserted probes to dynamically detect out of process correlating tokens and link them to the existing transaction execution flow. The mechanism of the present invention provides for inserting bytecode probes at runtime. The bytecode inserted probes are used to determine if an incoming user transaction should be recorded and linked to a transaction that began in another thread or process. The inbound request may use any method to pass a correlating token while it is running in-line with the user transaction, such as, for example, attaching the token in the J2EE filter or servlet via the HttpServletRequest object. Other possible methods of passing a correlating token include attaching the token as a message property of an outbound JMS message, to a CORBA PortableInterceptor and reading the ServiceContext, and to the SOAP header of a web service request. In this manner, the present invention provides for retrieving a correlating token in an inbound request using bytecode inserted probes to link cross-process or cross-thread sub-transactions into a single transaction.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamically monitoring and linking cross-process and cross-thread transactions in a bytecode injected application, the method comprising:

inserting a bytecode inserted probe into the bytecode injected application, wherein the bytecode inserted probe detects a correlating token in an inbound request, retrieves the correlating token and dynamically determines if the inbound request is a child of an out of process transaction, wherein the out of process transaction began in a cross-process or cross-thread, wherein the bytecode inserted probe uses any of a plurality of methods to detect and retrieve the correlating token from the inbound request, and wherein the correlating token is passed in the inbound request across thread boundaries and process boundaries using the plurality of methods including at least attaching the correlating token to one of an HTTP request, an outbound JMS message, a Common Object Request Broker Architecture message, and a Simple Object Access Protocol header of a web service request;

responsive to a determination that the inbound request is a child of an out of process transaction, recording the inbound request; and linking the inbound request to the out of process transaction.

2. The method of claim 1, wherein the bytecode inserted probe detects the correlating token in the inbound request using a TransactionInfo object.

3. The method of claim 1, wherein the correlating token includes a transaction monitoring policy, and wherein the transaction monitoring policy defines whether the inbound request should be recorded.

4. The method of claim 1, wherein the step of linking the inbound request to the out of process transaction is performed by a transaction performance monitor.

5. The method of claim 1, further comprising:
having the bytecode inserted probe determine if the inbound request is a root transaction.

6. The method of claim 1, further comprising:
having a transaction performance monitor determine if the inbound request is a root transaction.

7. The method of claim 5, wherein the inbound request is a root transaction if the bytecode inserted probe fails to locate the correlating token within a container.

8. The method of claim 1, wherein the bytecode inserted probe retrieves the correlating token from the inbound request while the bytecode inserted probe runs in-line with the inbound request.

* * * * *